Oct. 19, 1965   H. PAPST   3,212,482
INTERNAL COMBUSTION ENGINE WITH FUEL INJECTION
Filed Oct. 15, 1962   2 Sheets-Sheet 1
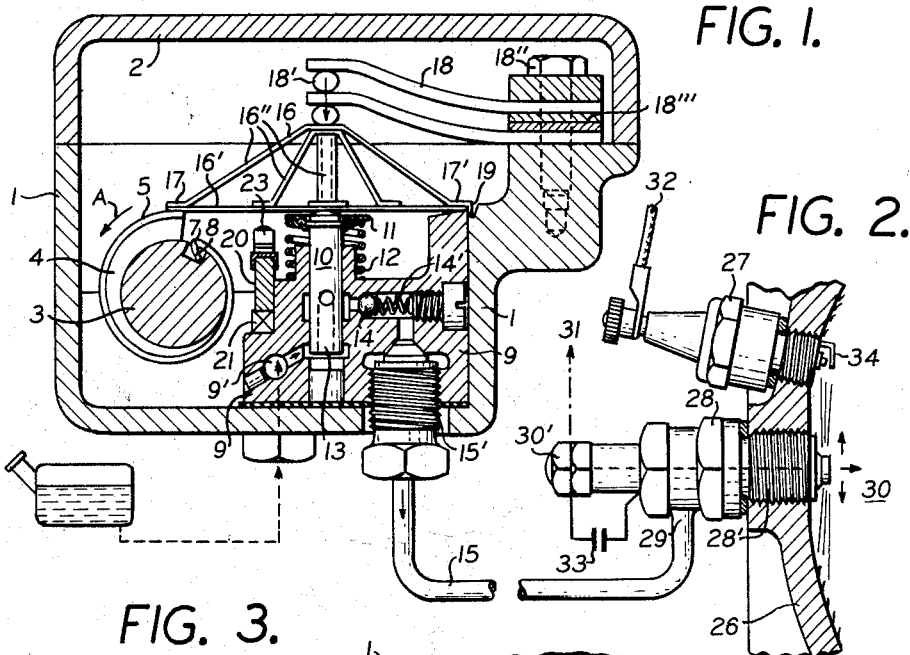
FIG. 1.
FIG. 2.
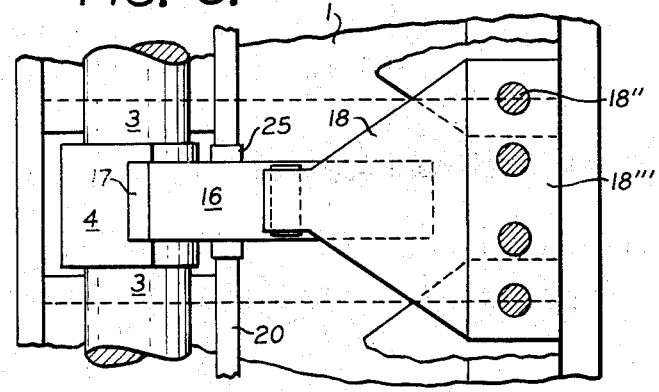
FIG. 3.
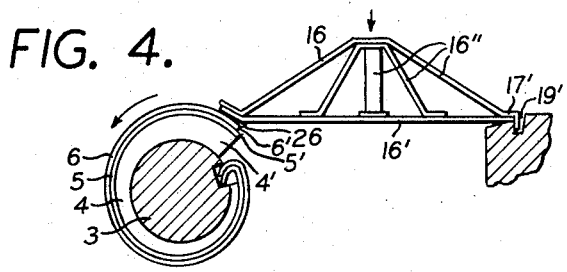
FIG. 4.
INVENTOR
HERMANN PAPST
BY
ATTORNEY.

Oct. 19, 1965  H. PAPST  3,212,482
INTERNAL COMBUSTION ENGINE WITH FUEL INJECTION
Filed Oct. 15, 1962  2 Sheets-Sheet 2
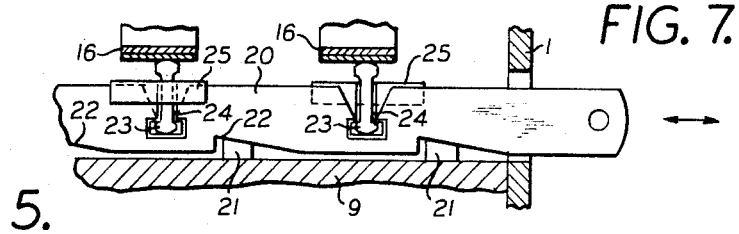
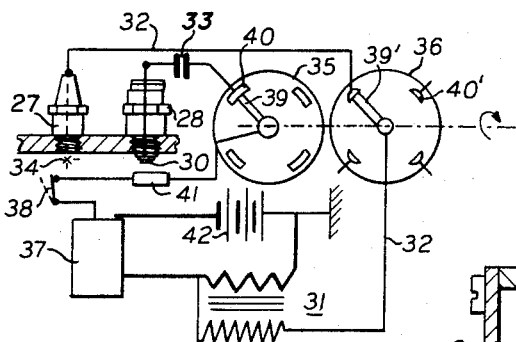
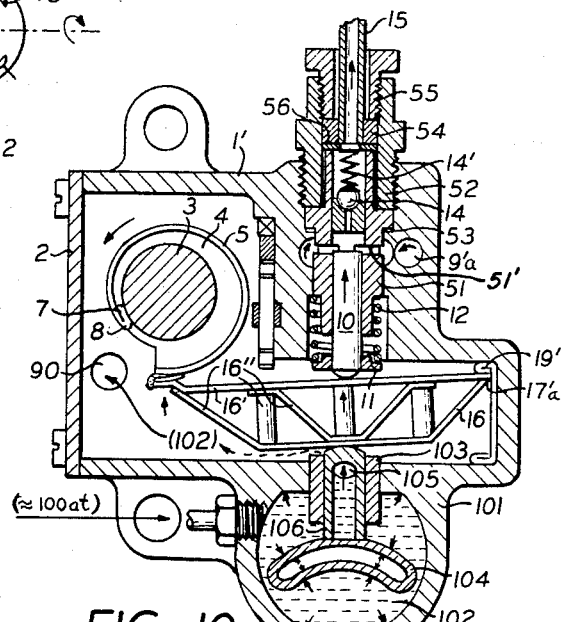
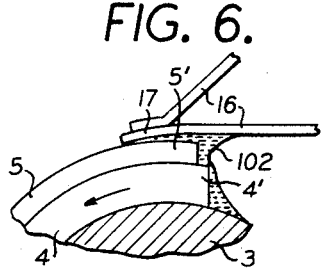
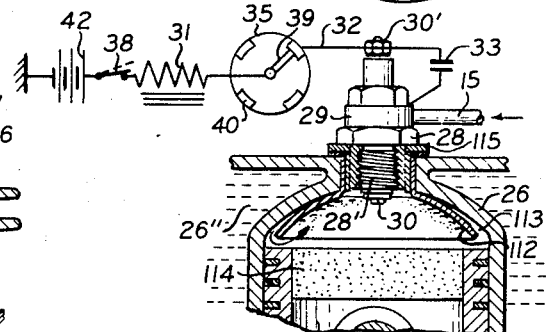
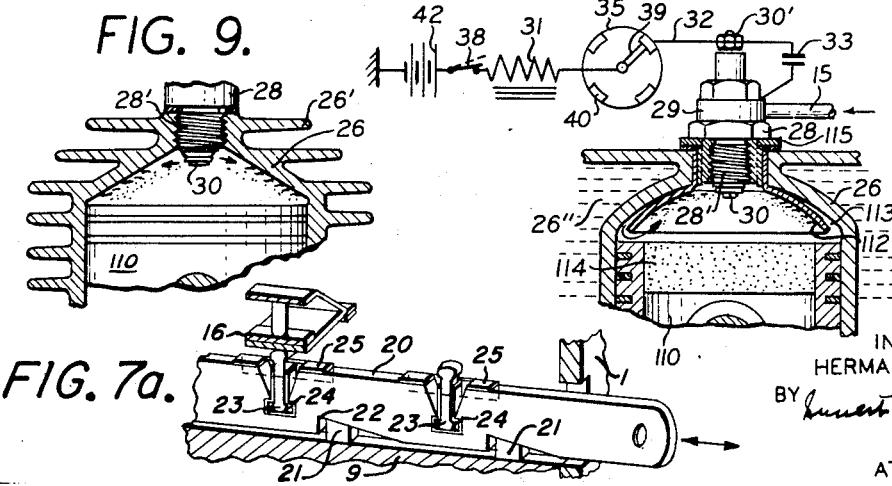
INVENTOR
HERMANN PAPST
BY
ATTORNEY.

United States Patent Office 3,212,482
Patented Oct. 19, 1965

3,212,482
INTERNAL COMBUSTION ENGINE WITH FUEL INJECTION
Hermann Papst, Pavillonweg 6, St. Georgen, Black Forest, Germany
Filed Oct. 15, 1962, Ser. No. 230,426
6 Claims. (Cl. 123—32)

This is a continuation-in-part application of the co-pending application Ser. No. 83,461, filed Jan. 18, 1961, now abandoned.

The present invention relates to an internal combustion engine with a fuel injection.

In view of the certain, characteristical drawbacks of the conventional Diesel and Otto engines, the problem arises to improve the internal combustion piston engine by more favorably working devices for the fuel injection and to provide a more advantageous distribution of the fuel in the combustion chamber, the endeavors being directed towards synthesizing the two kinds of engine to form a universal engine particularly suited to driving vehicles.

It is, therefore, one object of the present invention to prrovide an internal combustion engine with fuel injection, wherein an improved heat-exploitation of the fuel is brought about without creating any knocking ocurrences. The fuel injection device is to be reliable in operation and adjustable more particularly also for smaller cylinder volumes, as for instance, 250 cm.$^3$ It should be made possible, thereby, to use a plurality of cylinders for low power engines, thus helping to reduce noise.

It is another object of the present invention to provide an internal combustion engine with fuel injection, wherein by means of a fast operating injection which is obtained in the form of pulses and the provision of annular split nozzles, a fine and equal atomization of the fuel in the combustion chamber is brought about. A more complete burning even of very small fuel quantities should be achieved, and in particular not only during a low idle run, but also during high speed. During the low number of revolutions, no severe combustion surges should occur. Also at a full load and at a high number of revolutions, no knocking should be possiblle without particular additions of special anti-knock additions, as for instance, tetraethyl-lead.

It is yet another object of the present invention to provide an internal combustion engine with fuel injection, wherein the combustion is initiated at the beginning of the injection, in order to shorten the ignition delay. In order to bring about this result, valve gap nozzles with a make-and-break ignition have been proposed. These nozzles could, however, not be rendered operative with the conventional cam-operated pumps. During the start and at a slow speed, for instance, no reliable ignition could be achieved. The nozzles opened too little at ordinary injection pressure, so that the ignition has ceased completely. In order to obtain an ignition, the injection pressures had to be reduced to an unbearable extent, whereby the atomization has been impaired. In addition, the valve is raised much too slowly, due to the speed-dependent rise in delivery of the lifting cam, which rise is dependent upon the number of revolutions, whereby the ignition spark, instead of occurring on the outermost edge nozzle, jumped between the seat surfaces and corroded the same.

Injection pumps are known, in which cam followers are spring-loaded to drop over cam edges, which results in an injection which is independent of engine speed. These known pumps show, however, generally very massive levers, some of which operate by means of rollers, and with other heavy moving parts. They operate with far too much inertia for a light automotive vehicle, due to the applicable loading springs having a limited capacity. The effect of the inertia would be that at high engine speeds, the injection time would continue far too long a proportion of crank shaft rotation whereby, can after-burning and power losses are experienced.

An Otto engine having a drop cam pump has been also proposed. In these pumps, the drop lever strikes suddenly the pump plunger upon moving rapidly through a control distance, which is, however, tolerable only at very low injection pressures. This arrangement is, thus, also not suitable in connection with the pulsating injection system operated at a very much higher speed. The hammering action of the lever would soon upset the plunger rod, so that the same would jam and thus, the pump would fail.

Annular gap nozzles having a centrally guided valve have also been proposed, and have been used in individual cases. They are no longer used, however, because they open with conventional cam type injection pumps too slowly and unevenly. The atomization and stream distribution which they provide are, therefore, unsatisfactory.

It is, therefore, still a further object of the present invention to provide an internal combustion engine, in which the fuel is injected into compressed air by means of a nozzle supplied with fuel from a spring-loaded injection pump, operated by a spring-loaded cam follower following a drop cam in order to produce a brief and pulse-like injection of the fuel, so that when the cam-follower drops over an edge of the drop cam the spring of the cam-follower operates the pump to inject the fuel, the cam-follower being designed so as to be substantially rigid and having a relatively low inertia by making the cam-follower in the form of an open braced structure. Preferably, the nozzle is an annular gap nozzle and is effective also to provide a control contact for the ignition circuit.

It has been found, that an annular gap nozzle in cooperation with a power storage injection pump opens much faster and operates with a much greater stroke and cross-section, respectively, of the nozzle. The annular gap nozzle sprays, thus, at first at its entire periphery with such a pump and produces, thereby, an all-over uniform distribution of the fuel in the combustion chamber. The atomization is, thereby, also improved, because the gap has low flow resistance. This is particularly of importance where quantities of fuel are small. In particular, the electric ignition of the start of the stream is only possible by this combination, first of all at a low starting speed, due to the always adequate width of the outflow gap.

Due to the constant impulse effect, the injection takes place at low and median speeds, however, during a very small crank angle measure. This causes fast pressure increases and, thereby, a hard run of the engine.

It is yet a still further object of the present invention to provide an internal combustion engine with fuel injection, wherein the present combination is still further completed by providing such arrangement of the annular gap nozzle to the wall faces of the combustion chamber, that the fuel is sprayed towards the walls of the combustion chamber, in order to protect the same by a short-timed accumulation from a sudden combustion. The annular split nozzle sprays then the fuel in form of a flat sliding disk- or conical face-ray as a thin film over the walls of the combustion chamber. From these walls, it evaporates then hesitantly and burns then continuously.

These effects are improved by arranging an annular gap valve nozzle with an insulated valve serving as interrupter contact for the electric ignition of the start of the spray. The penetration of the fuel into the opening valve slot of a nozzle operating with a current break takes place due to the combination with the fast working power storage injection pump at such speed, that the breaking light spark is pushed immediately to the outer edges of the valve seat faces.

In accordance with the present invention, a possibly fast injection is provided, by arranging a slide lever suddenly falling down over a cam edge.

A divided injection with preliminary injection of a quantity of ignition fuel can be brought about by means of a cam with set-off edges.

The valve nozzle can control also a high voltage ignition, preferably by means of an electronic switching device.

The ignition current can be shut-off upon heating up of the engine for the protection of the terminals, if the ignition can take place by the increased compression temperature or on the faces of the combustion chamber, upon reaching the glowing state.

A further reduction of the disturbing mass is brought about such, that the cam lever and also the power accumulating spring is formed of wear-resistant and rigid material, for instance, a beryllium-chromium-nickel-alloy.

A very active power accumulation spring is also formed by means of a torsion rod, which serves simultaneously as rotary axle for the lever.

A very active power accumulator is also brought about by means of a liquid under pressurer, which operates like a spring which is not subject to fatigue.

In order to prevent hammer-like effects between the plunger and the lever, the pump plunger is continuously connected without play with the dropping lever member by means of a restoring auxiliary spring.

This cam face can be provided with a sleeve hooked into a groove thereof and consisting of particularly wear-resistant material.

A wear reduction is also brought about by means of an oil-lubrication wedge carrying hydrodynamically the power accumulator pressure.

With these and other objects in view, which will become apparent in the following detailed description, the present invention will be clearly understood in connection with the accompanying drawings, in which:

FIGURE 1 is a cross-section of an injection pump element with a drop cam shaft in a housing, the cam follower being shown in the most distant position from its support.

FIG. 2 is an elevation of an impulse-fed injection nozzle in the center of the cylinder head, shown in section, of an internal combustion engine with a spark plug controlled thereby;

FIG. 3 is a top plan view of the pump element shown in FIG. 1, the cover being removed, however, for better illustration;

FIG. 4 is a cam with sleeves and a dropping lever sliding thereon just immediately prior to the dropping step;

FIG. 5 is a circuit diagram of the control of the ignition voltage through the annular split nozzles for a four-cylinder engine;

FIG. 6 is a fragmentary elevation, partly in section, showing at an enlarged scale the cam edge with the end of the dropping lever and the oil-lubrication wedge;

FIG. 7 is a fragmentary elevation of a control rod in the pump housing;

FIG. 7a is a perspective front view of the control rod shown in FIG. 7;

FIG. 8 is a section through an injection pump with a hydraulic power accumulator and upwardly dropping lever;

FIG. 9 is an elevation of an annular split nozzle spraying partly towards the wall of an air-cooled cylinder head; and FIG. 10 is an elevation of a water-cooled cylinder head with a shell insert capable of glowing and with a piston bottom with a flatly spraying annular split nozzle and a condenser for the retardation of the make and break ignition.

Referring now to the drawings, and in particular to FIGS. 1 and 3, the present device comprises a housing 1 having a cover 2, in which housing a cam shaft 3 is mounted for rotation in the direction of the arrow A (FIG. 1). The cam shaft 3 is equipped with a cam 4 provided for each pump element. The rubbing surface of the cam 4 comprises in this embodiment a fitted, hard, resilient sleeve or bush 5 which joins the rotation of the cam shaft 3 and is formed at one end into a hook 7 which engages in an axially disposed peripheral groove 8 in the cam shaft 3.

A pump plunger 10 bears a flanged ring 11 engaged by a return spring 12 which also maintains the plunger 10 in permanent engagement with a lever 16. An intake channel 9' extends to the pump cylinders in the pump unit 9. The fuel which is sucked in when the pump plungers rise through passages 13 and through a pressure valve 14 operated by a spring 14' and through a nipple 15' into an injection line.

The plunger 10 is accelerated very rapidly by a drop lever 16 with its push- and pull-rods 16' and 16" when the sliding end 17 is urged downwards by a loading spring 18, which lever 16 is in the form of an open-braced structure in a light and rigid construction from high-strength strip material with a triangular system or double T profile of welded and hardened, as well as highly rigid working material.

The fuel is, therefore, forced in very rapid pulses through the pressure valve 14 having the spring 14' into the line 15. The end 17' of the drop lever 16 is hook-shaped and is retained in a recess 19 in the pump housing 1 to operate like a knife-edge bearing.

The drop lever is urged by spring strips 18 which serve as loading springs with the interposition of thrust rollers 18'. The lever 16 is suddenly accelerated downwards, as soon as the lever end 17 of the lever 16 passes the cam edge 6' (FIG. 4) and 5' and 4', respectively (FIG. 6). Advantageously, the camming surface having the attrition-resistant self-locking resilient sleeves 5 and 6, the drop lever 16 and the spring blades 18 are made of dispersion-hardened high-strength working material, for instance, a beryllium-chromium-nickel alloy. The resilient strips 18 are clamped by means of screw bolts 18" and intermediate shims 18'''. A narrow control rod 20 (FIGS. 1, 3 and 7) controls the quantity of oil supplied through the line 15 to an injection nozzle 28 at each pulse of the pump.

Referring now to FIG. 2 of the drawings, a portion of the bottom of a cylinder 26 is shown in which a spark plug 27 and an injection nozzle 28 are disposed close to each other. A conduit 15 terminates in an annular nipple 29. An insulated valve 30 operates as a control contact or as a direct breaking contact for the primary coil current of the ignition coil 31 (FIG. 5). Upon opening up the valve slot by the fuel, the current stoppage creates, by collapse of the field in the ignition coil 31, a high voltage ignition spark 34 on the spark plug 27 connected with the ignition coil 31 by means of an electrical conduit 32. The current stoppage brought about by opening of the terminals is retarded by means of a condenser 33 such, that a spark is created only after the fuel has reached the next ignition point.

For pre-injection of a small quantity of ignition oil in accordance with the showing in FIG. 4, a step is provided in front of the drop edge of the sleeve or bush 5 by means of the upper slightly withdrawn spring sleeve 6.

Referring now to FIG. 5, a circuit diagram is shown in which coupled distributors 35 and 36 are equipped with arms 39 and 39', respectively, and contact segments 40 and 40', respectively, which arrangement is made for a four-cylinder engine and the distributors 35 and 36 feeding successively high voltage discharges to the corresponding spark plugs controlled by the valve opening at the time of emergence of the fuel.

A relay 37 permits the flow of primary ignition current, as soon as the manually operated switch 38 is closed and the distributor arm 39 is in contact with a segment 40. A resistance 41 disposed in the circuit retains the control current, by example, to about ½₀ of the ignition current taken from a battery 42. Upon opening of the valve contacts 30, the arm 39 leaves always the segments 40.

Referring now to FIG. 6 of the drawings, the lever end 17 is shown just shortly before it drops away from the cam edge formed by the clamped-on cam sleeve 5. The cam edge 5 is rebated slightly behind the edge of the cam shaft 3 and 4. The under side of the end 17 of the lever 16 cooperates with the sleeve 5 to bound a very acute angle containing a bearing film 102 capable of carrying the lever 16 and consisting of engine lubrication oil. By such arrangement, the wear is appreciably reduced.

Referring now to FIG. 7 of the drawing, a flat bar or rod 20 has inclined surfaces 22 which bear against matching surfaces 21 in the pump housing 9. An axial movement of the control rod 20 therefore varies the drop and lift of the lever 16 by way of the flat pivot support 23. The supports 23 are received in recesses in the rod 20 and are retained in a central position by means of a U-shaped spring 24. The supports 23 yield thus slightly when the control rod 20 is moved and roll on the levers 16 and, in the control rod 20, on the springs 24. As soon however, as the lever 16 is raised by the cam 4, the bearer or support 23 returns into its central position. Fitted U-shaped members 25 provide lateral retention of the elements 23 and 24 in the control rod 20.

Referring now again to the drawings, and in particular to FIG. 8, the pump cylinder is adjustably secured in form of an exchangeable bushing 51 in a body 1' by means of the threaded sleeve 52 on adjusting rings 53. A tube 15 having a nipple 54 is secured by means of the hollow screw sleeve 55 and the sealing disk 56 to the threaded sleeve 52. Simultaneously, the valve 14 spring-biased by a spring 14' is accessible. As soon as the upper edge of the pump plunger 10 passes the upper edge of the lateral slots 51', provided in the bushing 51, the fuel is pressed under pressure through the tube 15. The pump plunger 10 is extremely fast accelerated by the lever 16 by means of the hydraulic pressure from the vessel 101 on the housing 1'. The pressure liquid 102 is preferably lubricating oil of the internal combustion engine. Cylindrical bushings 103 are inserted in the common wall of the body 1' and 101. The plunger 106, which is sealingly guided in the cylindrical bushing 103, is designed with a small mass. A gas bubble 105 is disposed in the piston 106. The latter includes a gas containing hose 104 of resilient material and is adapted to cooperate with the piston 106. The mass energy of the oil 102 in the vessel 101 is thus very low. The end 17a' of the lever swings about the pivot 19' in the pump housing 1'.

The oil escaping on the piston 106 can return through a bore 90 provided in the housing 1'.

Referring now to FIG. 9 of the drawings, the air-cooled cylinder 26 having cooling ribs 26' defines a combustion chamber jointly with the piston 110. The injection nozzle 28 is screwed into the cylinder bottom by means of a threaded connection 28', which cylinder bottom is subjected to greater cooling than the cylinder. The cooling ribs 26' maintain the temperature at desired limits. The fuel ejected as a radial flame spray from the valve 30 hits slidingly the conically shaped cylinder wall. The fuel is received by the air of the combustion chamber from the wall face of the cylinder 26. The combustion takes place then in divided form and not suddenly, even upon immediate ignition of the first part of the spray.

Referring now to FIG. 10 of the drawings, a tray-like insert 112 is disposed in the cylinder 26 which consists, for instance, of heat-resistant sheet metal. The insert 112 forms a small space 113 from the cylinder 26, which space 113 serves the purpose to operate as a heat-resistance. The distance is, however, so small, that nearly no stream can get behind the tray 112 during the combustion process. The tray 112 can be secured, for instancce, by means of a threaded nipple 115. The nipple carries then also an inner thread for the injection nozzle 28.

Compared with the conditions shown in FIG. 9 of the drawings, the temperature of the tray 112 can reach such a high point as up to 340° C., that at least at the outer edge the glowing state is reached. The fuel emerging from the nozzle 30 and widening to all sides can slide along the gas skin formed by it and protected against wall engagement. The vaporization of the plane spray spread very thin as a film can then take place to a great extent without decomposition. The glowing of the tray 112 is even favored in such manner, that the piston 110 has a bottom consisting of a disk 114 made of poorly conducting material, which is resistant against temperature changes and made of an oxide ceramic material or the like. Quartz glass is suitable therefor, which has been proposed already for measuring technical purposes for the short observation of the combustion.

It is proposed, in accordance with the present invention, to shrink the plunger bottom disk 114 as a cylinder. In this case, a compensation of the heat-expansion of the piston takes place. During operation, the center portion of this disk will reach the glowing state. This favors a fast combustion and permits a lower compression as it is usual in conventional Diesel engines. Such engines do not need to be formed so heavily any more, and due to the reduced heat losses during the combustion process operate economically.

The tray 112 having the insulating space 113 permits a water-cooling of the cylinder 26. The oil is fed to the ignition nozzle 28 through the conduit 15 by means of the nipple 29.

The valve 30 is electrically insulated and connected by means of a distributor 35 having segments 40 with the ignition coil 31 and the battery 42. The distributor arms 39 having brushes feed the current through the metal segments 40 to the corresponding injection nizzle. The circuit can be arranged also such, that in each valve contact feeding 32 an ignition coil 31 is disposed. A condenser 33 is provided, in order to retard, as much as possible, the time stoppage, until the valve slot at 30 is filled with oil. Then the make and break arc of the current takes place on outer edge faces of the valve 30 in the combustion chamber. The valve seat faces remain then sealed for a longer time.

An extension of the operational period of the valve nozzle with an arc make-and-break-contact can be obtained in such manner, that upon heating the parts 112 and 114 after a certain operational period, the ignition current is shut off by means of a switch 38 and under circumstances automatically.

The condenser 33 can have only a small size and exerts a short retarding effect, in order not to weaken the make-and-break arc. The valve 30 must, therefore, be very light, and must be opened very fast by means of the fuel injection pulse and the slit must be filled with fuel prior to an essential drop of the current in the ignition coil. Also, the fuel distribution is then proper because the split nozzle has now less friction. The tray stream penetrates sufficiently also in case of use of small quantities and a low number of revolutions. It is also possible to discharge the valve 30 in accordance with the circuit shown in FIG. 5 from the ignition energy by means of the electronic switch 37.

The nozzle is screwed, in the same manner as shown in FIG. 2, to the member 28' in the cooled cylinder 26. The heat transfer in the threaded connection is satisfactory. The nozzle 28 thus does not assume a higher temperature than the cylinder wall. The heat penetrating into the small valve end face of the nozzle 30 is returned by the fuel fed into the combustion chamber. The valve remains, therefore, at a low temperature. Vapor bubbles formation and disturbance caused thereby are avoided.

The improvement obtained for a Diesel operation in connection with annular slot nozzles in combination with a power accumulator injection pump and electric ignition are complete combustion, low compression ratio, enlargement of the upper range of speed and application of much smaller stroke volumes than 250 cm.³. The engines become additionally more independent from the starting temperature and from the type of fuel applied.

While I have disclosed several embodiments of the present invention, it is to be understood that these embodiments are given by example only and not in a limiting sense, the scope of the present invention being determined by the objects and the claims.

I claim:
1. A fuel injection unit including an injection nozzle comprising a spring-loaded injection pump supplying fuel to a nozzle,
   a drop cam,
   a spring-loaded cam-follower following said drop cam in order to produce a brief and pulse-like injection of fuel by means of said nozzle, so that upon dropping said cam-follower over an edge of said drop cam-follower operates said pump to inject the fuel, and
   said cam-follower being substantially rigid and having an open braced structure of relatively low inertia.

2. The fuel injection unit, as set forth in claim 1, wherein
   said drop cam has stepped drop edges for subdivided injection of the fuel.

3. The fuel injection unit, as set forth in claim 1, wherein
   said cam-follower is made of precipitation hardened material.

4. The fuel injection unit, as set forth in claim 1, wherein
   said spring-loaded cam-follower includes a spring in the form of a torsion bar which serves also as a bearing or pivot for said cam-follower.

5. The fuel injection unit, as set forth in claim 1, wherein
   said drop cam has a relatively hard interchangeable covering.

6. The fuel injection unit, as set forth in claim 1, wherein
   the portion of said cam-follower engaging said cam maintains a lubricating oil wedge between said cam and the cam-engaging surface of said cam follower.

References Cited by the Examiner
UNITED STATES PATENTS

| | | | |
|---|---|---|---|
| 1,926,499 | 9/33 | Ricardo | 123—32.3 |
| 2,403,440 | 7/46 | Jansson | 123—32 |
| 2,534,322 | 12/50 | Thaheld | 123—32.4 |
| 2,960,973 | 11/60 | Davis | 123—32 |

FOREIGN PATENTS

| | | |
|---|---|---|
| 992,440 | 7/51 | France. |
| 905,907 | 3/54 | Germany. |
| 973,933 | 7/60 | Germany. |
| 582,619 | 11/46 | Great Britain. |

MARK NEWMAN, *Primary Examiner.*

RICHARD B. WILKINSON, *Examiner.*